United States Patent [19]
Aoki et al.

[11] Patent Number: 4,807,444
[45] Date of Patent: Feb. 28, 1989

[54] AIR FLOW CONTROL DEVICE

[75] Inventors: Katsuyuki Aoki; Hiroyuki Umemura; Tetsuji Okada; Kenji Matsuda; Hidenori Ishioka, all of Shizuoka; Isao Arai, Kamakura; Kenji Togashi, Shizuoka; Masanori Hara, Kamakura; Sakuo Sugawara, Kamakura, all of Japan

[73] Assignee: Mitsubishi Denki Kabushiki Kaisha, Tokyo, Japan

[21] Appl. No.: 104,214

[22] Filed: Oct. 5, 1987

[30] Foreign Application Priority Data

Nov. 19, 1986 [JP] Japan ............... 61-275812
Dec. 11, 1986 [JP] Japan ............... 61-295174

[51] Int. Cl.[4] .................................. F25D 17/06
[52] U.S. Cl. ...................... 62/179; 62/186; 236/49
[58] Field of Search ............ 62/179, 186; 236/49, 236/38; 165/16; 98/116

[56] References Cited

U.S. PATENT DOCUMENTS

| 3,479,947 | 11/1969 | Myers | 98/116 |
| 3,536,413 | 10/1970 | Hosono et al. | 98/116 X |
| 3,653,590 | 4/1972 | Elsea | 236/49 |
| 4,368,843 | 1/1983 | Kai et al. | 236/49 |

FOREIGN PATENT DOCUMENTS

| 47-17158 | 6/1972 | Japan . | |
| 55-121341 | 9/1980 | Japan . | |
| 59-30971 | 7/1984 | Japan . | |
| 59-191842 | 10/1984 | Japan . | |
| 0000230 | 1/1985 | Japan | 236/38 |
| 60-41730 | 3/1985 | Japan . | |
| 0059145 | 3/1986 | Japan | 236/38 |
| 0122444 | 6/1986 | Japan | 236/49 |

Primary Examiner—Harry B. Tanner
Attorney, Agent, or Firm—Oblon, Fisher, Spivak, McClelland & Maier

[57] ABSTRACT

An air flow control device for an air conditioner includes a compressor, an outdoor side heat exchanger, expansion means and a room side heat exchanger in sequence, wherein the improvement comprises a room side unit with a upper and lower outlet ports, having the room side heat exchanger therein, upper and lower air-blowing fans disposed in the room side unit so as to face the upper and lower outlet ports, respectively, controller for controlling the operations of the air-blowing fans, a covering member positioned at least one of the outlet ports so as to open and close the corresponding outlet port, and a driving device for controlling the opening and closing operations of the covering member.

7 Claims, 6 Drawing Sheets

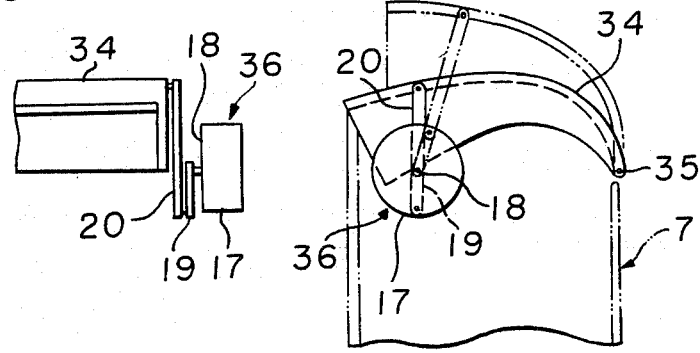
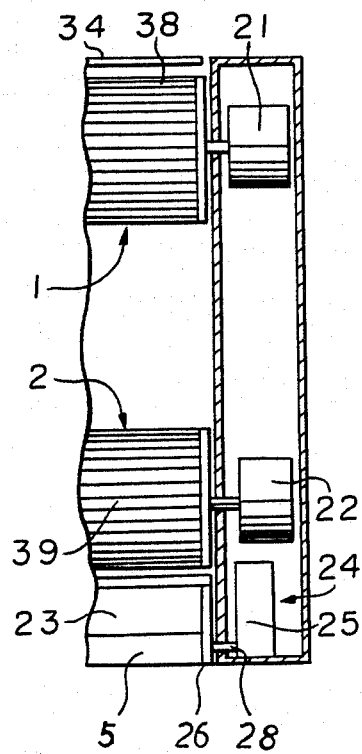
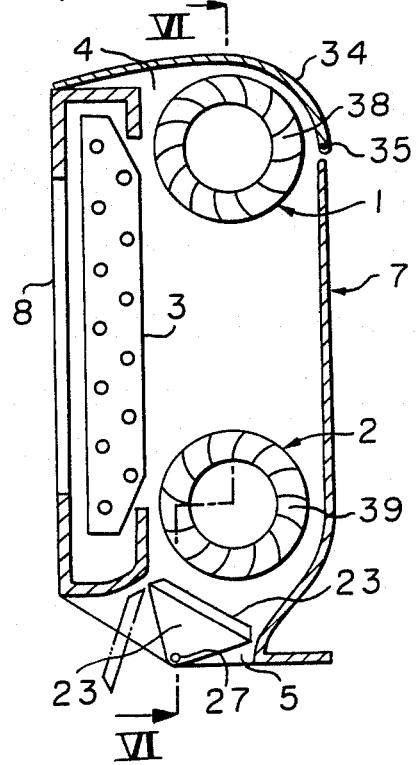

AIR FLOW CONTROL DEVICE

BACKGROUND OF THE INVENTION

The present invention relates to an air flow control device for an air conditioner with an upper outlet port and a lower outlet port.

A room side unit in the conventional air conditioner as, for example, disclosed in Japanese Unexamined Patent Publication No. 191842/1984, the vertical sectional view of which is shown in FIG. 11, comprises an upper air-blowing fan 1 disposed in its upper portion, a lower air-blowing fan 2 disposed in its lower portion and a room side heat exchanger 3 arranged between both fans 1 and 2. The room side unit 7 is provided with an upper outlet port 4 in its upper front portion, a lower outlet port 5 in its lower front portion and an intake port 8 in its middle front portion. The blowing fans 1 and 2 suck air into the unit through the heat exchanger 3 and blow out the conditioned air from the outlet ports 4 and 5, as indicated by an arrow 6.

FIG. 12 is a block diagram showing an air-blowing fan control system provided in the room side unit as shown in FIG. 11. The system includes air-blowing fan operation mode determining means 11 for determining the operation modes of both air-blowing fans, air-blowing fan operation control means 12 for controlling the operations of both fans, temperature detecting means 14 for detecting the temperature of the heat exchanger, temperature detecting means 15 for detecting the temperature of outlet air, and load calculating means 16 for calculating a load based on the detection temperature signal from the temperature detecting means 14 and the detection temperature signal from the outlet air temperature detecting means 15 and sending the results to the fan operation mode determining means 11.

The operation of the system will be described in reference to FIG. 13 wherein the operation modes of the fans and the temperature of the heat exchanger are shown in graphical representations.

Even when "heating" operation starts, both fans 1 and 2 maintain their OFF mode as shown in FIG. 13 at A and B until the temperature of the heat exchanger 3 reaches a preset value A, because the temperature of the heat exchanger 3 is lower than that value immediately after the heating operation has started. When the temperature of the heat exchanger 3 reaches the value A as shown in FIG. 13 at C, the upper air-blowing fan 1 is driven in its low speed mode. When the temperature of the heat exchanger reaches a preset value B, the fan 1 is driven in its high speed mode. In addition, when the temperature of the heat exchanger 3 rises to a preset value C, the lower blowing fan 2 is driven in its low speed mode. When the temperature reaches a preset value D, the lower blowing fan 2 is driven in its high speed mode.

Now, the operation of the system will be explained in reference to FIG. 12. The detection temperature signal from the heat exchanger temperature detecting means 14 and the detection temperature signal from the outlet air temperature detecting means 15 are fed to the load calculating means 16 to calculate the load condition. The load signal representing the calculated load condition is fed to the fan operation mode determining means 11 to determine the operation modes of both fans depending on the load signal. The determined operation modes are instructed to the controlling means 12 for controlling the operations of both fans. The control means 12 controls both fans 1 and 2 in accordance with the instructed operation modes.

In the conventional air conditioners, the operations of the upper and lower air-blowing fans are controlled solely on the basis of the load being calculated from the temperatures of the room side heat exchanger and the outlet air. As a result, the conventional air conditioners can not always provide a sense of comfort for users. They also have a disadvantage in terms of energy-saving because they wastefully heat the upper space in a room.

In addition, they maintain open the upper and lower outlet ports formed in their housing even when the corresponding air-blowing fans are not blowing out the conditioned air during their OFF mode. As a result, their housing has a great size in height and is not good in terms of design. They a further disadvantage in that dirt or debris comes into the housing through the outlet ports that are not blowing out the conditioned air such as cooled air.

SUMMARY OF THE INVENTION

It is a general object of the present invention to eliminate the disadvantage of the conventional air conditioners as explained above.

It is a more specific object of the present invention to provide an air conditioner capable of controlling an upper air-blowing fan and a lower air-blowing fan so that the temperature of the outlet air from a lower outlet port becomes of optimum value.

It is another object of the present invention to provide an air conditioner capable of controlling both fans in accordance with the operation mode which a user selects.

It is still another object of the present invention to provide an air conditioner having a housing of reduced height and a good appearance in terms of design.

It is a further object of the invention to provide an air conditioner capable of preventing dirt or debris from coming into the housing through the outlet port.

The foregoing and the other object of the present invention have been attained by providing an air flow control device for an air conditioner including a compressor, an outdoor side heat exchanger, expansion means and a room side heat exchanger in sequence, the improvement comprising a room side unit with an upper and a lower outlet port, having the room side heat exchanger therein, upper and lower air-blowing fans disposed in the room side unit so as to face the upper and lower outlet ports, respectively, controlling means for controlling the operations of the blowing fans, a covering member positioned at at least one of the outlet ports so as to open and close the corresponding outlet port, and driving means for controlling the opening and closing operation of the covering member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a partial side view showing the room side unit with the covering member and a covering member driving means;

FIG. 8 is a partial front view of the covering member and the covering member driving means;

FIG. 9 is a vertical sectional view of another embodiment of the room side unit with a covering member according to the present invention;

FIG. 10 is a partial vertical sectional view taken line on VI—VI;

DETAILED DESCRIPTION OF THE PREFERRED EMBODIMENTS

Figure 1:
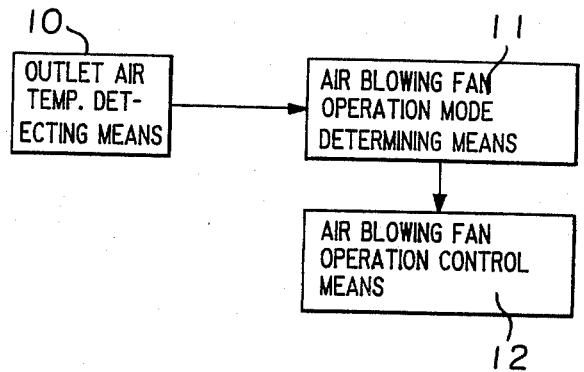
FIG. 1 is a functional block diagram showing an embodiment of the operation contol for the air flow control device according to the present invention.
Figure 12:
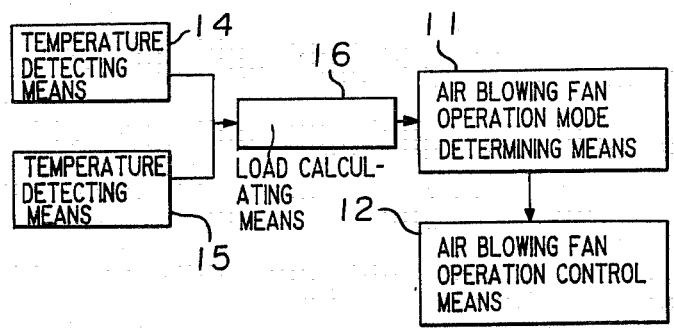
FIG. 12 is a functional block diagram of the operational control for the air-blowing fans in the conventional air conditioner.
Figure 13:
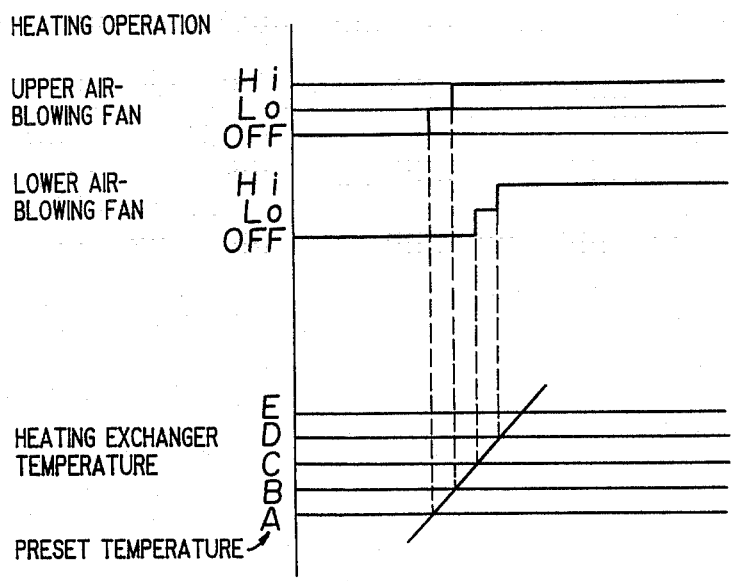
FIG. 13 is a graphical representation explaining the operation in the air conditioner shown in FIG. 12.

Now, the operation control of the air-blowing fans according to the present invention will be described in reference to FIGS. 1 through 4. FIG. 1 is the functional block diagram showing an embodiment of the operation control for the air flow control device according to the present invention, wherein the same means as those in FIG. 12 are designated with the same reference numerals. In FIG. 1, a reference numeral 10 designates an outlet air temperature detecting means for detecting the temperature of the outlet air which is blown out from a lower outlet port of a room side unit. Its output signal is fed to an air-blowing fan operation mode determining means 11. The mechanical structure of the room side unit is the same as the room side unit of the conventional air conditioner.

The operation of the air flow control device according to this embodiment will be explained in reference to FIG. 2.

When the air conditioner starts its heating operation by supplying power, the outlet air temperature detecting means 10 detects the temperature of the outlet air which is blown out from the lower outlet port by the lower air-blowing fan. The detection temperature signal output from the outlet air detecting means 10 is fed to the air-blowing fan operation mode determining means 11 to be used as data for determining the operation mode.

Figure 2:
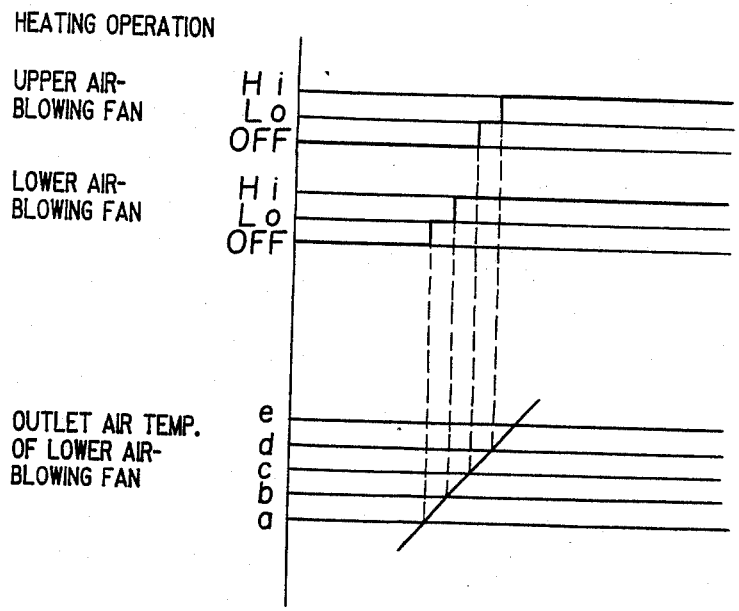
FIG. 2 is a graphical representation showing the operations of the fans and the outlet air temperature of the lower air-blowing fan in the operation control shown in FIG. 1.

When the temperature of the outlet air blown out from the lower outlet port by the lower fan is lower than a preset value (a) as shown in FIG. 2 at the time of starting the heating operation, the air-blowing fan operation mode determining means 11 maintains both fans in their OFF mode as shown in FIG. 2 at (a) and (b). When the temperature of the outlet air from the lower outlet port is between the preset value (a) and a preset value (b) as shown in FIG. 2 on starting, the air-blowing fan operation mode determining means drives only the lower blowing fan in its low speed mode. When the temperature of the outlet air from the lower outlet port is between the preset value (b) and a preset value (c) on starting, the air-blowing fan operation mode determining means drives only the lower fan in its high speed mode. When the temperature of the outlet air from the lower outlet is between the preset value (c) and a preset value (d) on starting, the air-blowing fan operation mode determining means drives the upper blowing fan in its low speed mode while continuing to drive the lower fan in its high speed mode. When the lower outlet air temperature is between the preset value (d) and a preset value (e) on starting, the air-blowing fan operation mode determining means drives both fans in their high speed mode.

These preset values (a) to (e) are stored in the memory for the operation mode determining means 11 at the time of production so that they are a higher temperature in sequence.

Although the embodiment has been explained only in the case that the rotations of both fans are step-controlled, the stepless rotation control as generally known can be adopted.

Figure 3:
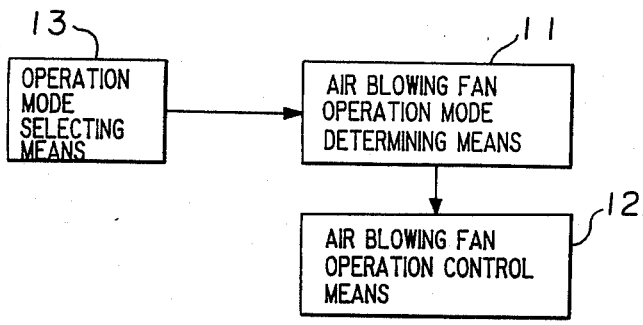
FIG. 3 is a functional block diagram showing another embodiment of the operation control for the air flow control device.

Now, another embodiment of the operation control for the air flow control device according to the present invention will be explained in reference to FIGS. 3 and 4. FIG. 3 is a functional block diagram, wherein the same means as those shown in FIG. 1 are designated with the same reference numerals. The second embodiment is different from the first embodiment in that in order to determine the operation mode of both fans, there is provided operation mode selecting means 13 in place of the lower outlet air temperature detecting means. The operation mode selecting means 13 enables a user to select either a "spot-heating" mode wherein the air conditioner heats a local spot in the room or a "room-heating" mode wherein the air conditioner heats the entire inside of the room.

Figure 4:
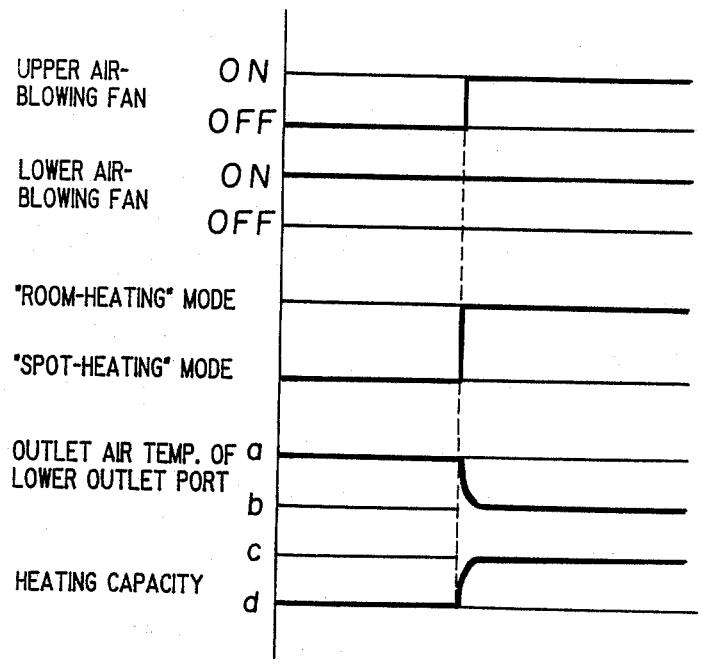
FIG. 4 is a graphical representation showing the operation in the operation control shown in FIG. 3.
Figure 6:
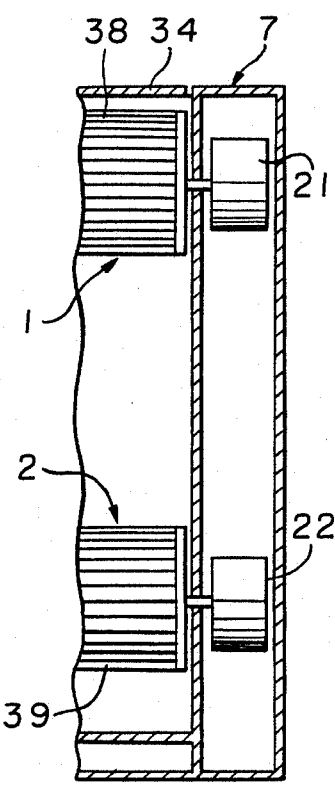
FIG. 6 is a partial vertical sectional view taken on line II—II of FIG. 5.

As shown in FIG. 4, in the "spot-heating" mode, the control device drives only the lower fan to feed the conditioned air from the lower outlet port so as to provide a sense of comfort for a user while carrying out high efficient operation wherein a full power heating operation is not needed.

In the "room-heating" mode, the control device drives both fans to uniformly heat the entire inside of the room with sufficient heating capacity. As a result, the control device can provide an efficient heating operation.

In accordance with the second embodiment, since a user can optionally select either the "spot-heating" mode or "room-heating" mode of both fans, a quite comfortable and efficient heating operation can be obtained.

Next, a covering member according to the present invention provided at the outlet port will be described with reference to FIGS. 5 through 10.

Figure 5:
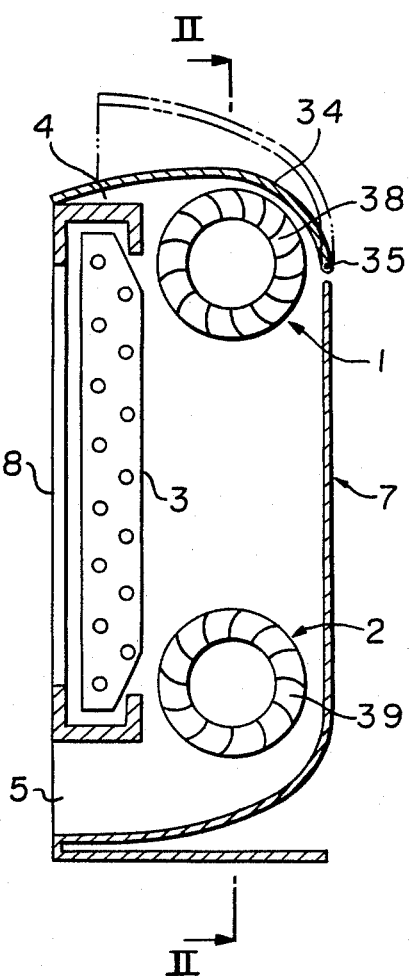
FIG. 5 is a vertical sectional view of an embodiment of the room side unit provided with a covering member according to the present invention.
Figure 11:
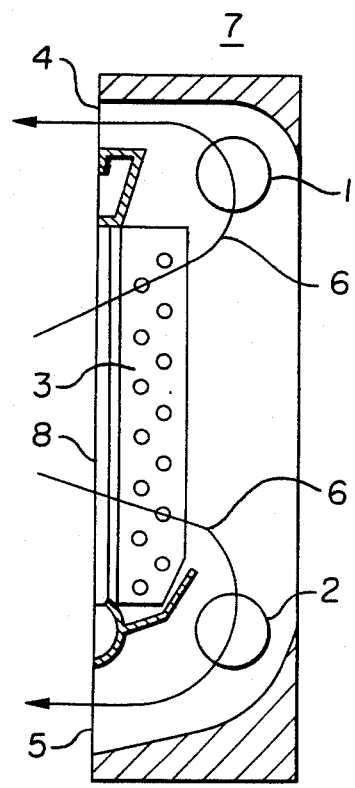
FIG. 11 is a vertical sectional view of the conventional room side unit.

The room side unit 7 has an upper outlet port 4 provided in its top surface portion and a lower outlet port 5 provided in its front lower portion as shown in FIGS. 5 and 9. The air-blowing fans 1 and 2 are arranged in the upper outlet port 4 and the lower outlet port 5, respectively.

The covering member 34 comprises a fan casing for the upper air-blowing fan 1. The covering member 34 forms a part of the top end of the room side unit 7 as shown in FIGS. 7 and 8, and it has its rear portion pivotally mounted to the rear top end of the unit 7 by means of a pin 35 so that it can turn about the pin in the upper and lower directions. Driving means 36 for turning the covering member 34 includes reversible motor 17, the output shaft 18 of which is coupled to the covering member 34 through link mechanism comprising arms 19 and 20. There are provided electric motors 21 and 22 for the upper and lower fans 1 and 2, the output shafts of which are coupled to impellers 38 and 39, respectively.

The operation of the covering member 34 will be explained. In the cooling operation, the forward operation of the electric motor 17 of the driving means 36 turns the arm 19 in the clockwise direction to moves the covering member 34 upward to the position indicated by two dots and dash lines in FIGS. 5 and 7 thereby to open the upper outlet port 4. The electric motor 21 for the upper fan 1 is energized at the same time as or a little later than the electric motor 17 for the driving means 36 has been energized, so that the impeller 38 is rotated to intake the air in the room into the unit 7 through an intake port 8. The intake air passes through the heat exchanger 3 to be cooled, and the cooled air is blown out from the upper outlet port 4 into the room. On the other hand, when the cooling operation is stopped, the electric motor 21 for the upper fan 1 is stopped, and the electric motor 17 of the driving means 36 is reversionally driven to bring the covering member 34 into close contact with the upper end of the unit 7 for closing the upper outlet port 4.

On heating, the conditioned air is blown out from the lower outlet port 5 while the covering member 34 is closing the upper outlet port.

In place of providing the covering member 34 and the driving means 36 at the upper outlet port 4, there may be provided a lower covering member and its driving means in the lower outlet port so as to turn the lower covering member downward for opening the lower outlet port on heating. The lower covering member and its driving means have structure similar to the upper covering members and its driving means, respectively, except that they are upside down. There can be provided the covering member and the driving means in each outlet port.

Instead of forming the covering member 34 with the fan casing, the covering member can be formed with a wind direction control flap provided in the outlet port. FIGS. 9 and 10 show the embodiment wherein the covering member is formed with the wind direction control flap. In these Figures, the same reference numerals as those in FIG. 1 through FIG. 8 designate identical or corresponding parts. In the modified embodiment, there are provided the covering member 23 comprising the wind direction control flap arranged in the lower outlet port 5 and driving means 24 for operating the covering member 23. The driving means 24 includes a reversible motor 25, the output shaft 28 of which is coupled to a shaft 27 of the covering member 23 through crank mechanism 26. Only when the room is heated, the electric motor 25 is forwardly driven so as to protrude the lower end of the covering member 23 downward of the unit 7 for opening the lower outlet port as shown by two dots and dash lines in FIG. 9. When stopping the heating of room, the electric motor 25 is reversely driven to fit the covering member in the lower outlet port 5 for closing it as shown by the solid lines in FIG. 9. In the embodiment, the structure and operation other than described above are the same as the embodiment in FIG. 5 through FIG. 8.

As described above, in accordance with the present invention, in an air conditioner including a compressor, an outdoor side heat exchanger, expansion means and a room side heat exchanger in sequence, there are provided a room side unit with an upper and a lower outlet port, having the room side heat exchanger wherein, upper and lower air-blowing fans disposed in the room side unit so as to face the upper and lower outlet ports, respectively, control means for controlling the operations of the blowing fans, a covering member positioned at at least one of the outlet ports so as to open and close the corresponding outlet port, and driving means for controlling the opening and closing operations of the covering member. As a result, it becomes possible to control the operations of both fans depending on the lower outlet air temperature which gives great influence to a user's sense of comfort.

In addition, the dimension in height of the housing can be reduced. It is possible to prevent dirt or debris from coming into the housing through the outlet port which does not blow out the conditioned air. The covering member can close the outlet port to conceal the outlet port which does not blow out the conditioned air, which improves the appearance of the air conditioner in terms of design.

We claim:

1. In an air flow control device for an air conditioner including a compressor, an outdoor side heat exchanger, expansion means and a room side heat exchanger in sequence, wherein the improvement comprises:

a room side unit with an upper and lower outlet ports, having the room side heat exchanger therein, upper and lower air-blowing fans disposed in the room side unit so as to face the upper and lower outlet ports, respectively, controlling means for controlling the operations of the air-blowing fans, a covering member positioned at at least one of the outlet ports and movable so as to open and close the corresponding outlet port, and driving means for controlling the opening and closing operations of the covering member, wherein the controlling means comprises air-blowing fan operation modes determining means for determining the operation modes of the air-blowing fans in response to detection temperature signals from temperature detecting means, and air-blowing fan operation mode control means for controlling the operation of the air-blowing fans by the operation modes instructed from the air-blowing fan operation mode determining means, and wherein said air-blowing fan operation modes determining means comprises means for operating said lower air blowing fan at a high level when sensing a first temperature and for operating said upper air blowing fan only when sensing second temperature higher than said first temperature.

2. An air flow control device according to claim 1, wherein the covering member is provided on the upper outlet port.

3. An air flow control device according to claim 1, wherein the driving means drives the covering member toward its opening direction when the air blowing fan is driven.

4. An air flow control device according to claim 2, wherein the driving means drives the covering member toward its opening direction when the air-blowing fan is driven.

5. An air flow control device according to claim 3, wherein the driving means utilizes the driving power of the air-blowing fan to drive the covering member.

6. An air flow control device according to claim 1, wherein the covering member is constructed so as to carry out wind-direction control.

7. An air conditioner unit having a compressor, an outdoor side heat exchanger, expansion means, and a room side unit, comprising:
 a casing exhibiting a plurality of mutually opposite outlet ports wherein pivotally connected at one end to a remainder of said casing, and said cover member being movable between a first position in which an end thereof opposite to said pivotal connection is spaced from the remainder of said casing to define one of said outlet ports and a second position in which said end opposite to the said pivotal connection is positioned adjacent to the remainder of the casing to close said one outlet port;
 a room side heat exchanger and an intake port being located within said casing;
 a plurality of air blowing fans disposed in the room side unit which face the outlet ports, respectively;
 controlling means for controlling the operations of the air blowing fans; and
 driving means responsive to said controlling means for controlling the opening and closing of said covering member.

* * * * *